US 8,612,144 B2

(12) United States Patent
Cornelius et al.

(10) Patent No.: US 8,612,144 B2
(45) Date of Patent: Dec. 17, 2013

(54) METHOD FOR OPERATING A NAVIGATION DEVICE AND A CORRESPONDING NAVIGATION DEVICE

(75) Inventors: Rainer Cornelius, Diekholzen (DE); Heinz-Werner Pfeiffer, Hohenhameln (DE); Ralf Duckeck, Hildesheim (DE); Kishore Krishnan, Kerala (IN)

(73) Assignee: Robert Bosch GmbH, Stuttgart (DE)

( * ) Notice: Subject to any disclaimer, the term of this patent is extended or adjusted under 35 U.S.C. 154(b) by 1212 days.

(21) Appl. No.: 12/094,017

(22) PCT Filed: Oct. 23, 2006

(86) PCT No.: PCT/EP2006/067652
§ 371 (c)(1),
(2), (4) Date: Jun. 23, 2009

(87) PCT Pub. No.: WO2007/057277
PCT Pub. Date: May 24, 2007

(65) Prior Publication Data
US 2009/0299618 A1    Dec. 3, 2009

(30) Foreign Application Priority Data
Nov. 16, 2005  (DE) .......................... 10 2005 054 573

(51) Int. Cl.
*G01S 19/07*   (2010.01)
*G01S 19/41*   (2010.01)
*G01S 19/44*   (2010.01)

(52) U.S. Cl.
USPC .......................................... 701/470; 701/468

(58) Field of Classification Search
USPC ......... 701/200, 201, 431, 117, 119, 426, 412, 701/47; 398/33; 370/350; 340/995.13, 905; 455/133, 132, 277.1, 575.7; 342/357.75
See application file for complete search history.

(56) References Cited

U.S. PATENT DOCUMENTS

| 5,504,482 | A  | * | 4/1996 | Schreder .................. 340/995.13 |
| 6,532,414 | B2 | * | 3/2003 | Mintz .......................... 701/117 |
| 6,535,140 | B1 | * | 3/2003 | Goss et al. ..................... 340/905 |
| 6,542,808 | B2 | * | 4/2003 | Mintz .......................... 701/117 |
| 6,856,876 | B2 | * | 2/2005 | Breed et al. ...................... 701/47 |
| 7,254,378 | B2 | * | 8/2007 | Benz et al. ................. 455/277.1 |
| 7,499,683 | B2 | * | 3/2009 | Ogasawara ................... 455/132 |

(Continued)

FOREIGN PATENT DOCUMENTS

| EP | 1 063 625   | 12/2000 |
| EP | 1 536 580   | 6/2005  |
| FR | 2 846 811   | 5/2004  |
| JP | 2000-207682 | 7/2000  |

OTHER PUBLICATIONS

International Search Report, PCT International Patent Application No. PCT/EP2006/067652, dated Feb. 5, 2007.

*Primary Examiner* — Thomas Black
*Assistant Examiner* — Robert Payne
(74) *Attorney, Agent, or Firm* — Kenyon & Kenyon LLP

(57) ABSTRACT

In order to provide a method for operating a navigation device, which also receives TMC data using two tuners for ascertaining an optimum travel route, using which an optimal travel route is ascertainable using the largest amount of TMC data possible, after a first search by the second tuner, the TMC data found are compared with those of the first tuner and to use the second tuner for searching for another transmitter having other TMC data. Furthermore, a navigation device of an appropriate design is provided.

14 Claims, 5 Drawing Sheets

(56) References Cited

U.S. PATENT DOCUMENTS

| | | | |
|---|---|---|---|
| 7,676,202 B2 * | 3/2010 | Anton-Becker | 455/133 |
| 7,941,194 B2 * | 5/2011 | Ganwani et al. | 455/575.7 |
| 7,974,777 B2 * | 7/2011 | Deurwaarder et al. | 701/412 |
| 7,999,734 B2 * | 8/2011 | Morgan | 342/357.75 |
| 8,107,457 B2 * | 1/2012 | White et al. | 370/350 |
| 8,108,144 B2 * | 1/2012 | Forstall et al. | 701/426 |
| 8,180,558 B1 * | 5/2012 | Marko | 701/119 |
| 2003/0109986 A1 * | 6/2003 | Tseng | 701/211 |
| 2004/0208526 A1 * | 10/2004 | Mibu | 398/33 |
| 2010/0268449 A1 * | 10/2010 | Feng | 701/201 |

* cited by examiner

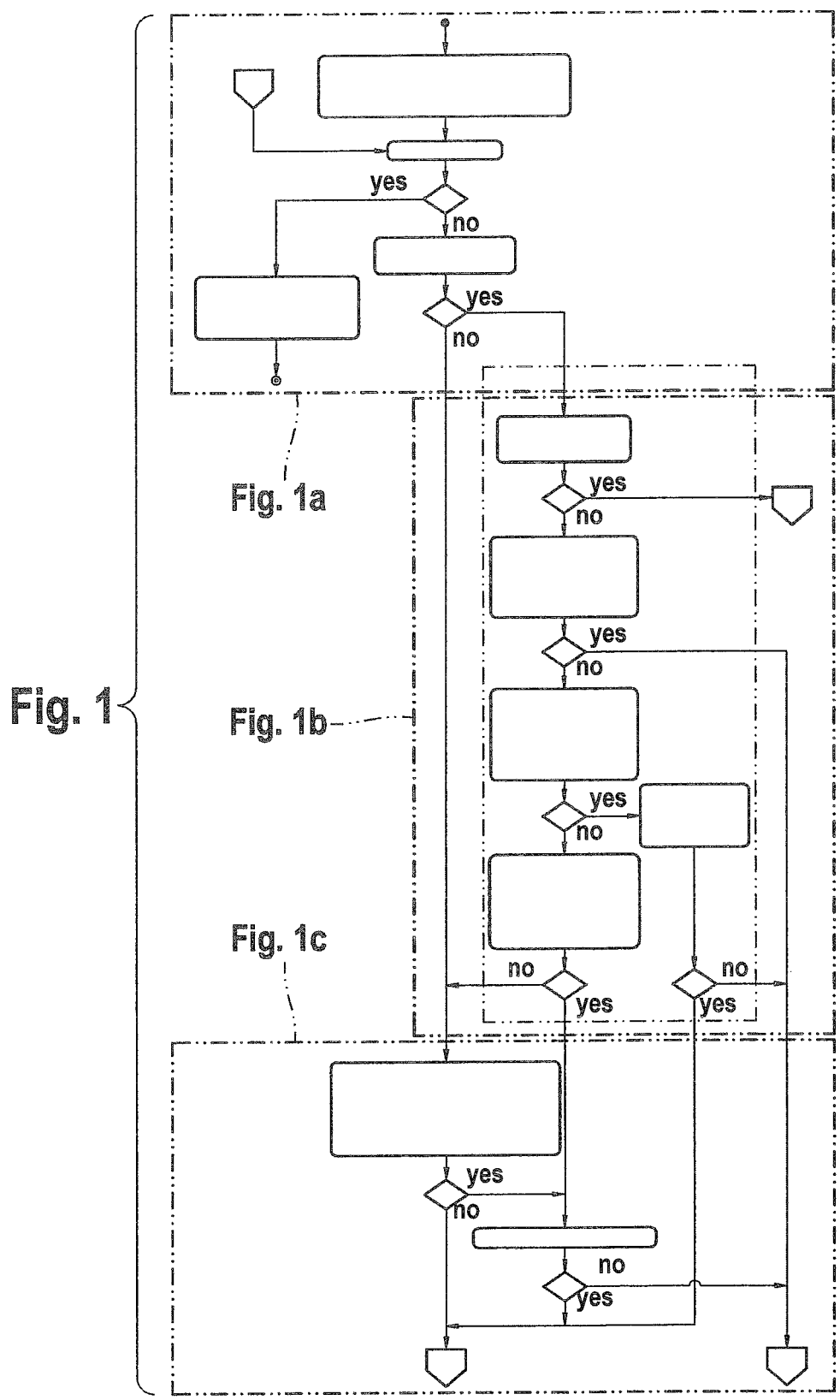

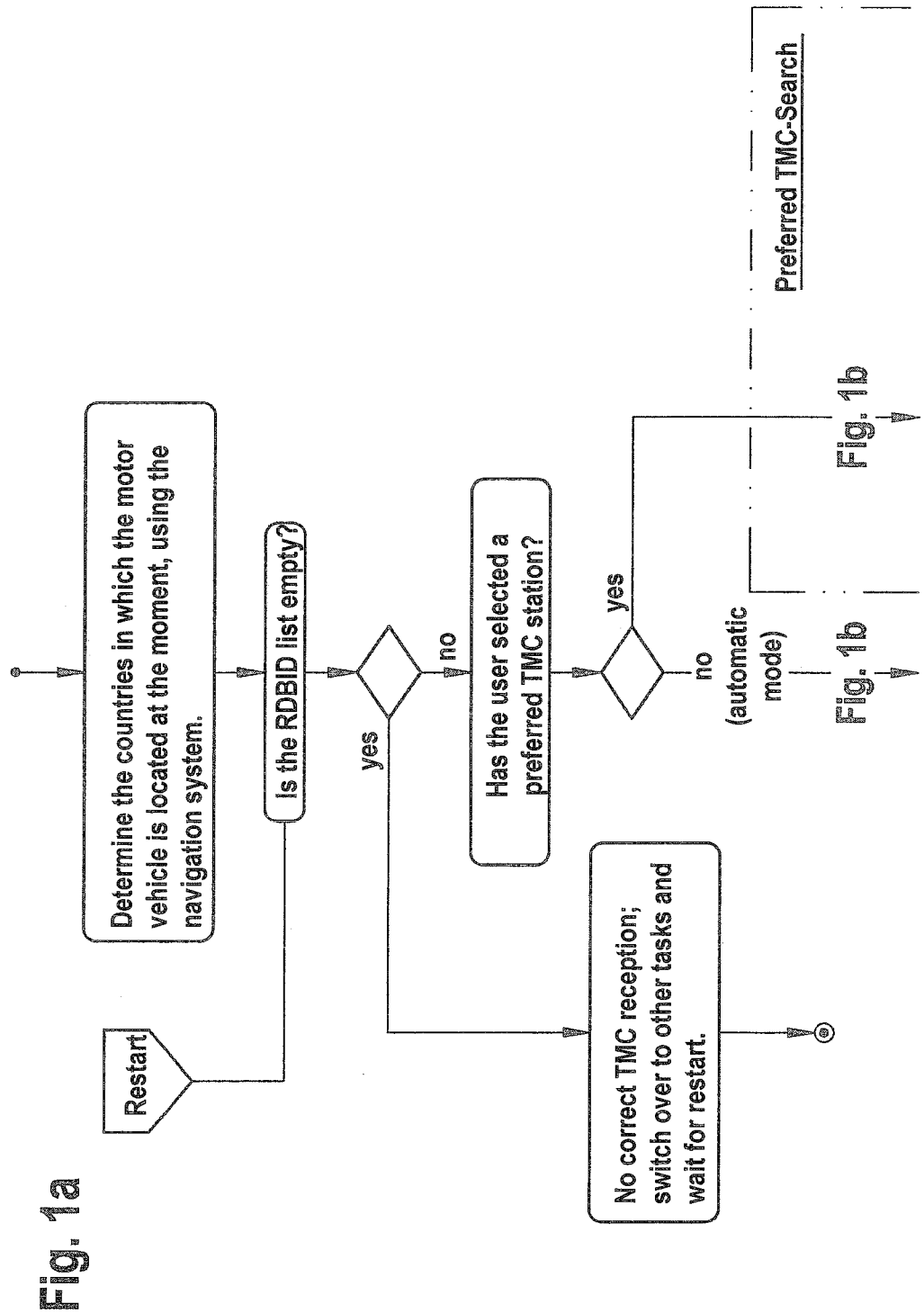

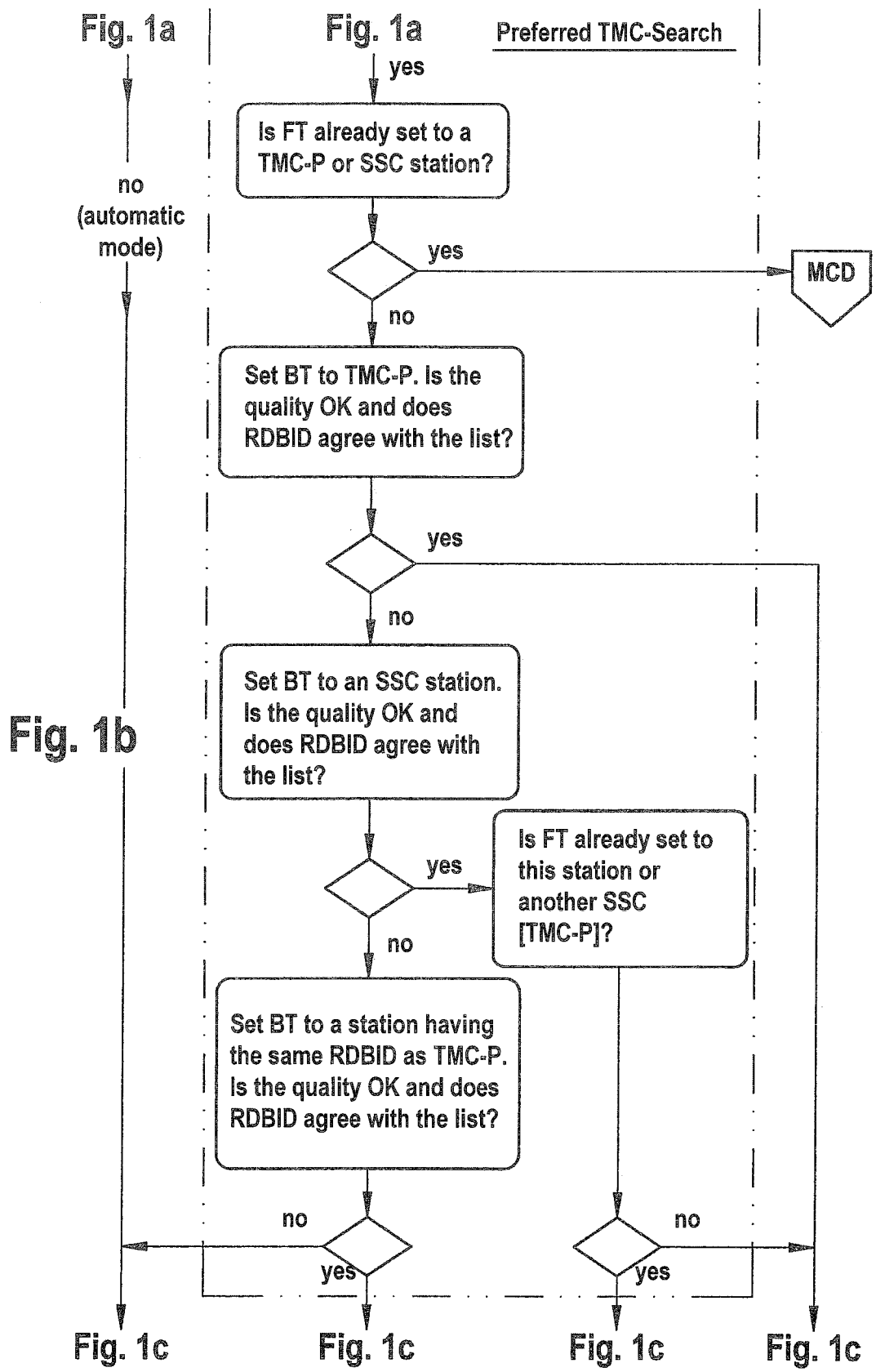

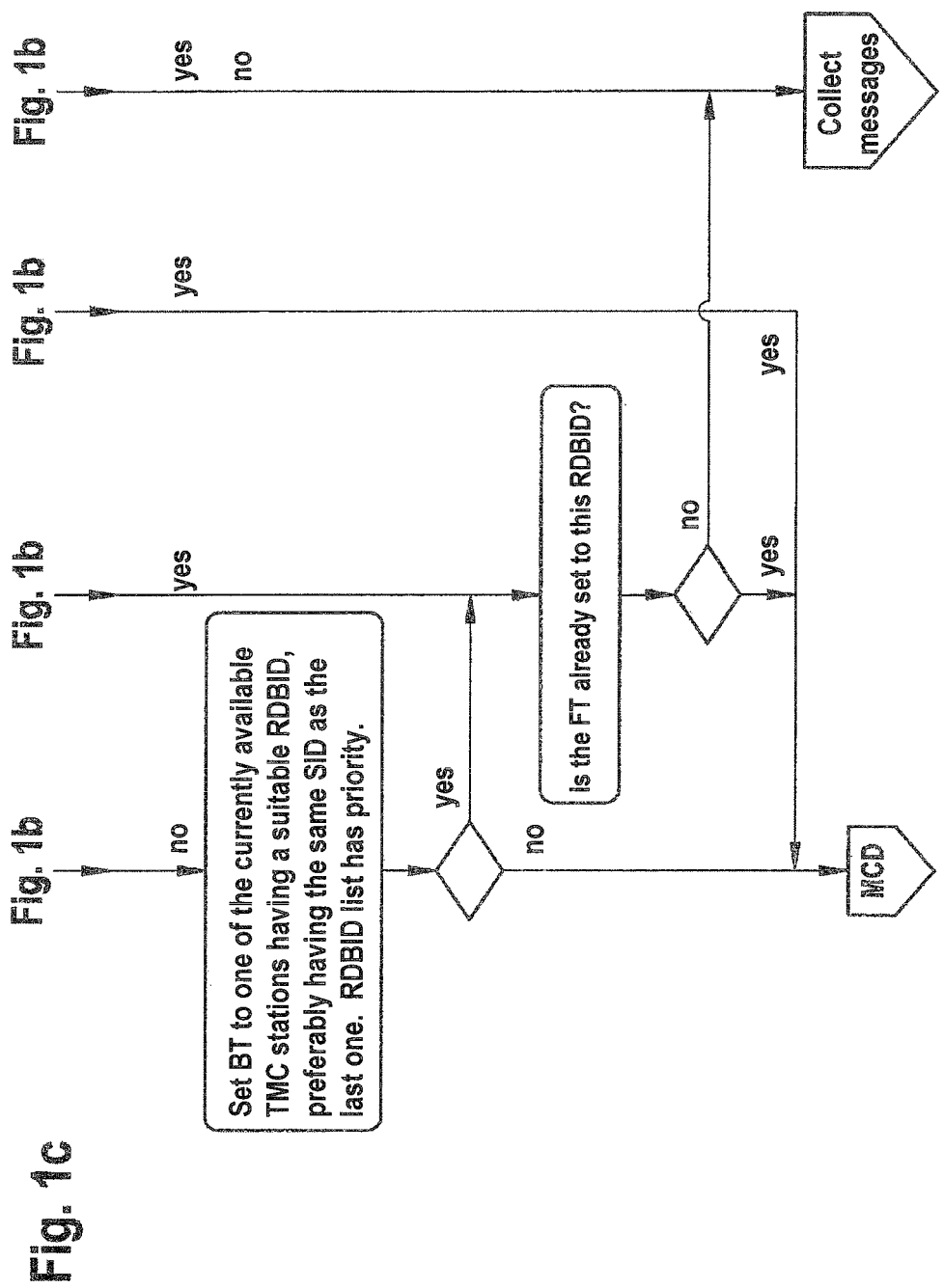

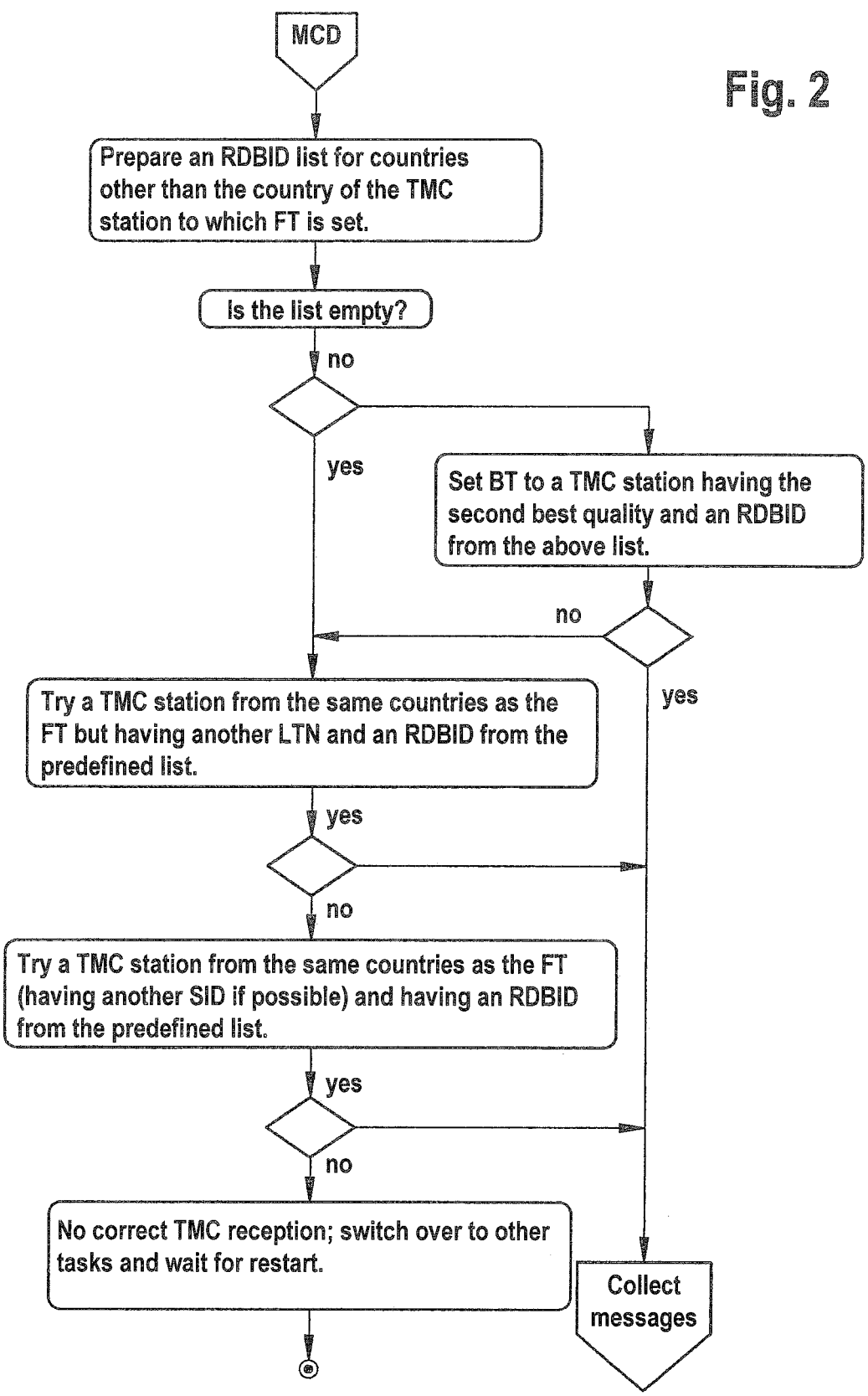

METHOD FOR OPERATING A NAVIGATION DEVICE AND A CORRESPONDING NAVIGATION DEVICE

This application is a 371 of PCT/EP 2006/067652 filed on Oct. 23, 2006

FIELD OF THE INVENTION

The present invention relates to a method for operating a navigation device, which also receives TMC data using two tuners for ascertaining an optimum travel route, and a corresponding navigation device.

BACKGROUND INFORMATION

Navigation devices are known and used in different specific embodiments. They essentially include a position determining device, which its position on the earth's surface in an essentially known way with the aid of signals transmitted by GPS satellites or, in the future, by Galileo satellites. Furthermore, a routing device is known, which, on the basis of this position, calculates a route to a destination predefined by the user of the navigation device and outputs appropriate directions visually and/or acoustically. For this purpose, information regarding the route and road network of the area to be traveled is used for routing for a motor vehicle, such information being stored on a replaceable CD-ROM or DVD, for example. Due to the large amount of data needed in this case, it is known that, for example, only the countries of Central Europe with their route information are stored on a CD-ROM, and another CD-ROM must be inserted for other countries.

In addition, today's navigation devices receive information, for example, about a temporary traffic jam or a road closure on the previously calculated travel route with the aid of so-called TMC (traffic message control) data. These TMC data are transmitted by radio stations and received by the navigation device or navigation system using a tuner appropriate for this purpose. TMC data are transmitted simultaneously with the actual radio signals, i.e., for example, a piece of music. The information about the radio transmitters or the frequencies at which these TMC data are transmitted is also stored on the CD-ROM provided for this country or area. Navigation devices are also known which are able to receive TMC data with the aid of a so-called dual-tuner concept, i.e., using two receivers for radio signals.

It is considered disadvantageous here that the navigation device having the associated tuners or radio receivers constantly attempts to receive the appropriate TMC data or to look for a TMC transmitter for all countries that are stored on the CD-ROM or DVD. The compilation time is therefore unnecessarily extended, and the response time until all relevant TMC messages are compiled for the area traveled at a given time is too long. In addition, the tuners are overburdened with unnecessary tasks, so that even in the essentially known dual-tuner concept, the problem arises that a correct transmitter search, for example, for RDS functionalities, is no longer possible to perform.

SUMMARY

Example embodiments of the present invention provide a method for operating a navigation device of the above-mentioned type which ensures that all relevant TMC data can be collected and taken into account in further calculating the travel route. Furthermore, a navigation device of appropriate design is to be also provided.

A basic idea of example embodiments of the present invention is that a navigation device collects TMC data or TMC messages for the currently traveled area or country in an essentially known manner with the aid of two additional tuners, and these messages are taken into account in the subsequent calculation of a travel route, making it possible to avoid a traffic jam, for example, in a timely manner. Furthermore, the hardware and software of the navigation device are designed in such a way that, after the second tuner has found a transmitter having TMC data and received the corresponding messages, the first tuner is then checked for the TMC messages received and stored there. If the messages are identical, the navigation device may conclude that either the same transmitter or two transmitters belonging to the same transmitter chain broadcasting the same program but on different frequencies are set on both tuners. Accordingly, in another search run, the second tuner is prompted to look for another TMC transmitter in order to look for TMC data that may differ from those received by the first tuner. If the TMC data received by the first and second tuners are already different, it may be assumed that two different transmitters are being received and therefore the amount of available data for further calculation of an optimum travel route is already as large as possible. Either of the two tuners may be considered to be the first or the second tuner. They may also be referred to as the foreground tuner and the background tuner.

The method may be easily implemented in the navigation device, so that virtually no additional effort is needed in its manufacture. In addition, by automatically ascertaining a larger amount of TMC data, it is ensured that an optimum travel route, for example, avoiding traffic jams or construction sites, is always displayed to the user.

TMC data of another country may be received by one of the two tuners, in particular when approaching an international border. Approaching an international border may be easily established by the navigation device because the position of the navigation device and that of the border are known. For example, when getting within 50 kilometers of an international border, which is to be crossed according to the travel route calculation, the navigation device should automatically start looking for TMC data from the next country using one of the two tuners. In the same way, the navigation device may estimate a time to crossing the international border using the average speed and the distance to the border and, for example, start collecting TMC data half an hour before crossing the border. Of course, a plurality of transmitters of a transmitter chain, each of which transmits at different frequencies, may also be successively set. Making a distinction between the individual transmitters is then possible via the country code of the transmitter, which is transmitted together with the TMC data.

According to example embodiments, a transmitter belonging to the transmitter chain of a preferred TMC transmitter is searched for. Such a transmitter essentially broadcasts the same program, but at another frequency, and may occasionally offer a better reception quality. If a transmitter of this type is set to the first tuner, a search for TMC data from another country may be performed using the second tuner.

If no reception from any transmitter belonging to the transmitter chain is possible, a transmitter having the same regional database identification number as the preferred TMC transmitter is searched for. If the first tuner is set to such a transmitter, messages from another country may be searched for using the second tuner.

If such a transmitter also cannot be found, a TMC transmitter having the best possible reception quality may be searched for by the second tuner in an automatic mode; this transmitter should be located in the country where the motor vehicle is located at the moment. A TMC transmitter having the same service identification number as the last transmitter set should also be searched for. This is important because otherwise important TMC data may be lost because other transmitters having other service identification numbers may transmit the data in a different sequence.

Example embodiments of the present invention are described below in greater detail with reference to the drawings.

BRIEF DESCRIPTION OF THE DRAWINGS

FIGS. 1 and 2 show a flow chart of the method according to example embodiments of the present invention.

DETAILED DESCRIPTION

The schematic depictions of FIGS. 1 and 2 show the sequence of the method for operating a navigation device of appropriate design having two tuners. FIG. 1 essentially describes the reception of TMC data using a navigation device having two tuners; the novel type of search operation for more TMC data with the aid of two tuners, schematically depicted in FIG. 2 using two branches, may be selected as indicated by the box containing the letters MCD.

TMC data are additionally ascertained essentially by comparing the TMC data found with the aid of a second tuner with those of the first tuner in order to then search for another transmitter possibly having additional TMC data. If this is not possible, for example, because there is no transmitter having further TMC data in the reception range, the second tuner may be occupied with other tasks or may be prompted after a certain waiting time to automatically search for further TMC data, possibly also from a neighboring country, into which the calculated travel route leads.

What is claimed is:

1. A method for operating a navigation device that also uses two tuners to receive Traffic Message Channel (TMC) data for ascertaining an optimum travel route, comprising:
   comparing, by a computer processor, first TMC data to second TMC data, wherein the second TMC data is of a first one of the two tuners and the first TMC data is found in a first search by a second one of the two tuners; and
   based on a result of the comparing, searching, by the second tuner, for a station with third TMC data.

2. The method according to claim 1, wherein at least one of the first, second, and third TMC data is of a country different than that in which the navigation device is situated.

3. The method according to claim 1, wherein at least one of the two tuners searches for the TMC data of a different country responsive to approaching an international border.

4. The method according to claim 1, wherein at least one of the two tuners is configured to search for a station belonging to a station chain of a predefined preferred TMC data transmitting station, all of the stations of the chain broadcasting essentially a same program.

5. The method according to claim 1, wherein at least one of the two tuners is configured to search for a station assigned a same regional database identification number as a predefined preferred TMC station.

6. The method according to claim 1, wherein, in an automatic mode, the second tuner searches for a TMC station with a best possible reception quality.

7. A navigation device, comprising:
   two tuners for receiving Traffic Message Channel (TMC) data for ascertaining an optimum travel route; and
   a processor configured to compare first TMC data to second TMC data, wherein the second TMC data is of a first one of the two tuners and the first TMC data is found in a first search by a second one of the two tuners;
   wherein the second tuner is configured to, based on a result of the comparison, search for a station with third TMC data.

8. The navigation device according to claim 7, wherein at least one of the first, second, and third TMC data is of a country different than that in which the navigation device is located.

9. The navigation device according to claim 7, wherein at least one of the two tuners searches for the TMC data of a different country responsive to approaching an international border.

10. The navigation device according to claim 7, wherein at least one of the two tuners is configured to search for a station belonging to a station chain of a predefined preferred TMC data transmitting station, all of the stations of the chain broadcasting essentially a same program.

11. The navigation device according to claim 7, wherein at least one of the two tuners is configured to search for a station assigned a same regional database identification number as a predefined preferred TMC station.

12. The navigation device according to claim 7, wherein, in an automatic mode, the second tuner is configured to search for a TMC station with a best possible reception quality.

13. The navigation device according to claim 7, wherein, responsive to approaching a state boundary, at least one of the two tuners receives TMC data of a state different than a state in which the navigation device is situated.

14. The method according to claim 1, wherein, responsive to approaching a state boundary, at least one of the two tuners receives TMC data of a state different than a state in which the navigation device is situated.

* * * * *

UNITED STATES PATENT AND TRADEMARK OFFICE
CERTIFICATE OF CORRECTION

PATENT NO.         : 8,612,144 B2                                    Page 1 of 1
APPLICATION NO.    : 12/094017
DATED              : December 17, 2013
INVENTOR(S)        : Cornelius et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1616 days.

Signed and Sealed this
Twenty-second Day of September, 2015

Michelle K. Lee
*Director of the United States Patent and Trademark Office*